United States Patent [19]

Allan et al.

[11] Patent Number: 4,501,820
[45] Date of Patent: Feb. 26, 1985

[54] METHOD FOR THE RECOVERY OF A TUNGSTEN-CONTAINING CATALYST FROM COKE CONTAINING NICKEL AND VANADIUM

[75] Inventors: David E. Allan; Byron V. Molstedt, both of Baton Rouge, La.; Raam R. Mohan, Berkeley Heights, N.J.

[73] Assignee: Exxon Research & Engineering Co., Florham Park, N.J.

[21] Appl. No.: 518,026

[22] Filed: Jul. 28, 1983

[51] Int. Cl.³ .................. B01J 23/92; C10G 11/04
[52] U.S. Cl. ........................... 502/27; 48/197 R; 208/123; 423/68; 423/150; 502/21; 502/28; 502/39; 502/51; 502/55; 502/516
[58] Field of Search ............ 502/27, 28, 21, 39, 502/51, 55, 516; 423/68, 150; 208/123, 216 R; 48/197 R

[56] References Cited

U.S. PATENT DOCUMENTS

| | | | |
|---|---|---|---|
| 2,920,936 | 1/1960 | Dille et al. | 423/68 |
| 3,214,346 | 10/1965 | Mason et al. | 202/31 |
| 3,226,316 | 12/1965 | Metrailer et al. | 208/46 |
| 4,089,806 | 5/1978 | Farrell et al. | 208/216 R |
| 4,203,759 | 5/1980 | Metrailer et al. | 75/0.5 BA |
| 4,244,811 | 1/1981 | Grenoble et al. | 208/123 |
| 4,268,415 | 5/1981 | Mohan et al. | 208/216 R |
| 4,269,696 | 5/1981 | Metrailer | 208/120 |

Primary Examiner—P. E. Konopka
Attorney, Agent, or Firm—Marthe L. Gibbons

[57] ABSTRACT

A tungsten-containing catalyst associated with coke containing vanadium and nickel is recovered by a method which includes steam gasification, low temperature burning to remove at least a portion of the coke and selective extraction of the nickel and vanadium.

8 Claims, 1 Drawing Figure

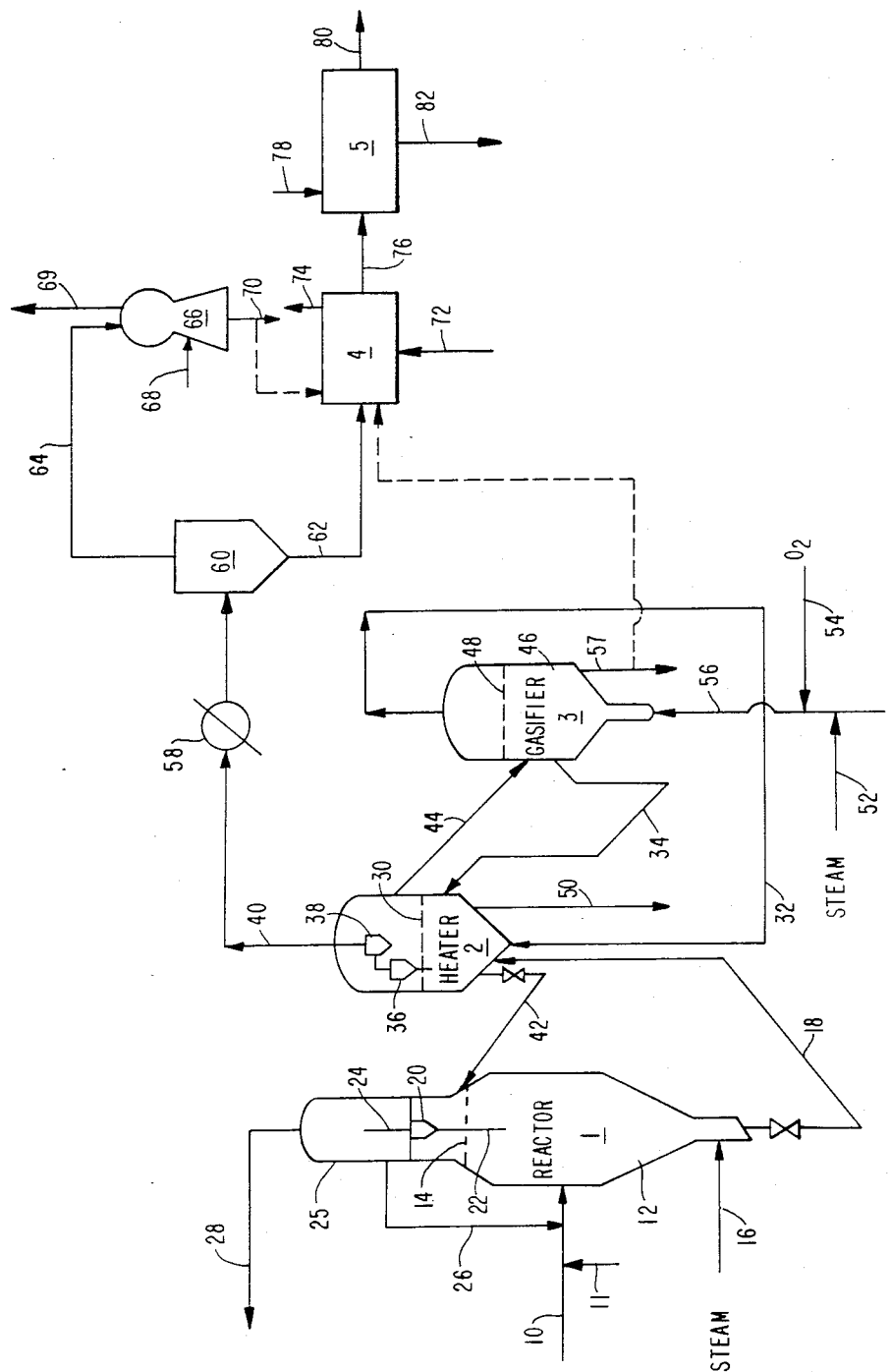

METHOD FOR THE RECOVERY OF A TUNGSTEN-CONTAINING CATALYST FROM COKE CONTAINING NICKEL AND VANADIUM

BACKGROUND OF THE INVENTION

1. Field of the Invention

The present invention relates to a method for the recovery of a tungsten-containing catalyst from coke containing other metallic components.

2. Description of the Prior Art

It is known to conduct coking processes in the presence of catalysts, including such catalysts as tungsten oxide on an alumina-containing support, see, for example, U.S. Pat. No. 4,269,696. During the coking reaction, catalyst present in the coking zone becomes associated with the coke product. The heavy hydrocarbonaceous oils used as feed for the coking process generally contain metallic contaminants, such as nickel, vanadium and iron. The coke which is produced from such metal-containing feeds contains at least a portion of the metallic contaminants that were present in the feed. When the coking process is conducted in the presence of a catalyst, it is desirable to recover the catalyst and to recycle it to the process. However, in recycling the catalyst, it is undesirable to recycle other metallic contaminants, e.g., vanadium and nickel, and thereby increase the concentration of the metallic contaminants in the coking zone. Several methods of recovering vanadium and/or nickel contaminants from coke are known.

U.S. Pat. No. 3,226,316 discloses a method of removing metal contaminants from coke using a gas-containing free oxygen and a halogen-containing material at a temperature of at least about 600° F.

U.S. Pat. No. 3,214,346 discloses a method of removing ash constituents, such as vanadium, from fluid coke by oxidizing the coke with air at a relatively low temperature, cooling the particles and extracting them with an agent such an an alkali metal hydroxide and aqueous hydrogen chloride solution to remove the ash constituents from the coke particles.

U.S. Pat. No. 4,203,759 discloses a process for the preparation of a vanadium-containing metallic ash concentrate by heating a partially steam gasified coke comprising metallic components at a temperature below 1050° F. in the presence of an oxygen-containing gas to burn the coke and produce a vanadium-containing metallic ash concentrate and alteration of the catalyst support.

Although there are methods available to remove the metal contaminants from the coke, a method was needed which would remove vanadium and nickel, but would minimize the removal of the metallic components of the catalyst and alteration of the catalyst support.

It has now been found that a tungsten-containing catalyst associated with coke containing nickel and vanadium may be recovered by a relatively low temperature burning to remove the coke followed by selective extraction of the nickel and vanadium.

SUMMARY OF THE INVENTION

In accordance with the invention there is provided, a method of recovering a catalyst comprising a tungsten component from solids comprising said catalyst associated with a coke comprising metallic components, including nickel and vanadium, which comprises the steps of:

(a) contacting said solids with a gas comprising steam at a temperature ranging from about 1600° F. to about 2000° F. to gasify partially said coke;

(b) heating the resulting solids at a temperature below the fusion point of said metallic components, said temperature being not greater than about 1100° F. in the presence of a molecular oxygen-containing gas for a time sufficient to remove at least a portion of the coke from said solids;

(c) contacting the solids resulting from step (b) in an extraction zone with an extractant having an acid function and an oxidizing function, to remove selectively said nickel and said vanadium from said solids, and (d) recovering said catalyst comprising said tungsten component.

DESCRIPTION OF THE PREFERRED EMBODIMENT

The tungsten-containing catalyst associated with the vanadium and nickel-containing coke which is suitable for treatment in accordance with the present invention may be coke obtained from a metal-containing feed derived from any coking process, such as delayed coking or fluid coking, in which a tungsten-containing catalyst was present in the coking zone. The tungsten-containing catalyst may be an unsupported catalyst, such as tungsten oxide or a tungsten sulfide, or the catalyst may comprise a tungsten component and a refractory support, such as alumina, silica, silica-alumina, magnesia, boria, zirconia, calcium oxide and mixtures thereof. The preferred catalyst is a tungsten oxide on an alumina-containing support which may additionally contain a minor amount of silica.

Referring to the FIGURE, a carbonaceous material having a Conradson carbon residue of about 15 wt.%, such as heavy residuum having a boiling point at atmospheric pressure from about 1000° F.+ is passed by line 10 into a coking zone 12 in which is maintained a fluidized bed of solids, e.g., particles of 10 to 1000 microns in size having an upper level indicated at 14, which comprise coke and a catalyst comprising tungsten oxide on a silica-stabilized alumina support. The catalyst may have been added to the process by addition to the feed by line 11 or via circulating solids stream, or directly into the coking zone. The catalyst may be fresh catalyst or recycled catalyst. Carbonaceous feeds suitable for the present invention include heavy hydrocarbonaceous oils, heavy and reduced petroleum crudes, petroleum atmospheric distillation bottoms, petroleum vacuum distillation bottoms, pitch, asphalt, bitumen and other heavy hydrocarbon residues; liquid products derived from coal liquefaction processes, including coal liquefaction bottoms, and mixtures thereof. Typically, such feeds have a Conradson carbon residue of at least 5 wt.%, generally from about 5 to about 50 wt.%, preferably above about 7 wt.% (as to Conradson carbon residues, see ASTM Test D189-65). A fluidizing gas, e.g., steam, is admitted at the base of coking reactor 1 through line 16 in an amount sufficient to obtain a superficial fluidizing gas velocity in the range of about 0.5 to about 5 feet per second. Coke at a temperature above the coking temperature, for example, at a temperature from about 100° to about 800° F. in excess of the actual operating temperature of the coking zone is admitted to reactor 1 by line 42 in an amount sufficient to maintain the coking temperature in the range of about 850° to about 1400° F., preferably from about 900° to about 1200° F. The pressure in the coking zone is maintained in the range of about 0 to about 150 pounds per square inch gauge (psig), preferably in the range of about 5 to about 45 psig. The lower portion of the coking reactor 5 serves as a stripping zone to remove occluded hydrocarbons from the coke. A stream of coke is withdrawn from the stripping zone by line 18 and circulated to heater 2. Conversion products are passed through cyclone 20 to remove entrained solids which are returned to the coking zone through dipleg 22. The vapors leave the cyclone through line 24 and pass into a scrubber 25 mounted on the coking reactor. If desired, a stream of heavy materials condensed in the scrubber may be recycled to the coking reactor via line 26. The coker conversion products are removed from scrubber 25 via line 28 for fractionation in a conventional manner. In heater 2, stripped coke from coking reactor 1 (Cold coke) is introduced by line 18 to a fluid bed of hot coke having an upper level indicated at 30. The bed is partially heated by passing a fuel gas into the heater by line 32. Supplementary heat is supplied to the heater by coke circulating in line 34. The gaseous effluent of the heater, including entrained solids, passes through a cyclone which may be a first cyclone 36 and a second cyclone 38 wherein the separation of the larger entrained solids occurs. The separated larger solids are returned to the bed via the respective cyclone diplegs. The heated gaseous effluent which contains entrained solids is removed from heater 2 via line 40.

Hot solids comprising coke are removed from the fluidized bed in heater 2 and recycled to coking reactor 1 by line 42 to supply heat thereto. Another portion of solids comprising coke is removed from heater 2 and passed by line 44 to a gasification zone 46 in gasifier 3 in which is maintained a bed of fluidized solids having a level indicated at 48. If desired, a purge stream of solids may be removed from heater 2 by line 50. The gasification zone is maintained at a temperature ranging from about 1600° to 2000° F. at a pressure ranging from about 0 to about 150 psig, preferably at a pressure ranging from about 10 to about 60 psig, and more preferably at a pressure ranging from about 25 to about 45 psig. Steam by line 52 and a molecular oxygen-containing gas, such as air, commercial oxygen or air enriched with oxygen, by line 54 pass via line 56 into gasifier 3. The reaction of the coke in the gasification zone with the steam and an oxygen-containing gas produces a hydrogen and carbon monoxide containing fuel gas. The gasified product gas, which may further contain some entrained solids, is removed overhead from gasifier 3 by line 32 and introduced into heater 2 to provide a portion of the required heat as previously described. A purge stream of solids may be removed from the gasifier by line 57.

Returning to line 40, the heater gaseous effluent containing entrained solids is passed by line 40, if desired, through indirect heat exchanger 58 and then into tertiary cyclone 60 in which a portion of the entrained solids is separated and removed from the cyclone as dry solid fines by line 62. A gaseous hydrogen and carbon monoxide-containing stream including the remaining entrained solids, is removed from cyclone 60 by line 64 and passed to a wet scrubber such as a venturi-scrubber 66, a packed bed, a wet cyclone or other conventional equipment in which the solids-containing gas is scrubbed with a liquid introduced by line 68. The scrubbed fuel gas is recovered by line 69. At least a portion of the solids present in gaseous stream 64 is separated from the gas to form, with the scrubbing liquid, a dilute solids-liquid slurry, which is removed from the scrubber by line 70. The dilute solids-water slurry may be passed to a water removal stage (not shown) to remove at least a portion of the water from the slurry and to form a concentrated slurry. The dry fines removed by line 62 comprise partially gasified coke including metallic components comprising vanadium, nickel and the catalyst, i.e., tungsten oxide on a silica-stabilized alumina support, are passed by line 62 to heating zone 4 maintained at a temperature below the fusion point of the metallic components that are present in the solid fines that were introduced into heating zone 4. If desired, at least a portion of the solids removed from gasifier 3 by line 57 and/or a portion of the slurry removed by line 70, preferably after removal of a portion of the water, may be introduced into heating zone 4. The conditions in heating zone 4 must be such as to avoid localized high temperature which would cause fusion of the metallic components and thereby make their extraction and separation from the catalyst more difficult. Localized high temperature can be minimized by use of moderate temperature, reduced oxygen concentration or a combination of control of temperature and low oxygen concentration. Suitable temperatures in heating zone 4 include a temperature not greater than 1100° F., preferably a temperature ranging from about 700° F. to about 900° F., and a pressure ranging from atmospheric to several atmospheres. The pressure is not critical. A stream of air is passed by line 72 upwardly into a fixed bed of solids comprising the partially gasified vanadium-containing coke and catalyst which is disposed in heating zone 4. A heat removal means such as a steam coil (not shown) may be disposed in heating zone 4 to control the temperature. The solids are left in heating zone 4 for a time sufficient to remove at least a portion of the coke from the solids, for example, to remove at least 50 to 60 weight percent of the coke from the solids. It is not necessary to remove the coke completely from the solids and it may be desirable to retain a portion of the partially gasified coke with the solids. The carbonaceous matter that was removed from the solids was converted to carbon oxides which are removed overhead from heating zone 62 by line 74. The solid residue remaining in heating zone 4 after the heat-treatment comprises a catalyst which comprises tungsten oxide on alumina which may contain a minor amount of silica, the vanadium and nickel contaminants which are associated with the catalyst and whatever portion of partially gasified coke that was not removed from the solids during the heat treatment. Discrete particles of metallic ash may also be present. The solids are removed from heating zone 4 by line 76. If there are discrete large particles of metallic contaminants, they may be removed from the catalyst by any known physical means due to difference in densities or other physical characteristics. The tungsten-containing catalyst particles associated with nickel and vanadium are passed by line 76 to extraction zone 5 in which the solids are contacted with a selective extractant for vanadium and nickel. The selective extractant used is such that it will not remove a significant portion of the tungsten from the catalyst nor adversely affect the other components of the catalyst. The extractant and extraction conditions will be such that less than 10 weight percent, preferably less than 5 weight percent of the tungsten, calculated as elemental metal, will be removed from the solids being treated in the extraction zone. The selective extractant must comprise an acid function and an oxidizing function. These can be provided by utilizing an acid having an acid function and at least one oxygen atom. The acids may be inorganic acids or organic acids. Suitable inorganic acids having at least one oxygen atom include $H_2SO_4$, $H_2SO_3$, $HClO_4$, $HClO_3$, $H_2S_2O_3$, $H_2N_2O_2$, $HNO_2$, $HNO_3$. If desired, the extractant may additionally comprise hydrogen peroxide ($H_2O_2$) or a similar oxidizing agent. Suitable organic acids include oxalic acid, tartaric acid, and the like. Suitable strength of the acid ranges from 0.2 normal to about 12 normal. Preferably a dilute concentration of acid is utilized, such as from about 0.2 normal to 1.0 normal.

The temperature in the extraction zone will generally be maintained between 70° F. and 250° F., preferably between 100° and 160° F. The pressure in the extraction zone will generally range from 0 psig to about 1000 psig, preferably from about 0 to about 250 psig. The residence time of the solids in the extraction zone will depend upon the temperature and the acid employed and will generally range from about 1 minute to about 150 minutes, preferably from about 3 minutes to about 60 minutes. Under the given conditions in extraction zone 5, a major portion of the vanadium and nickel associated with the catalyst introduced into the extraction zone will be extracted into the aqueous solution, while removing less than about 10 weight percent of tungsten, preferably less than 5 weight percent of the tungsten from the catalyst. Furthermore, the other components of the catalyst such as the aluminum component are also not significantly removed from the catalyst. The aqueous solution containing the extracted nickel and vanadium metals is removed from extraction zone 5 by line 82. The extracted catalyst particles having a decreased amount of nickel and vanadium are removed from extraction zone 5 by line 80 and washed with water. The recovered catalyst is suitable for recycle to the coking process.

EXAMPLE

Coke prepared from a vacuum residuum having an atmospheric pressure boiling point of 1050° F.+ comprising 10 weight percent of a catalyst which comprised tungsten oxide on an alumina support is herein designated solid A.

Solid A was ground and steam gasified at 1700° F. to gasify the coke partially. The resulting product, herein designated solid B, had a particle size of less than 200 mesh (Tyler) and contained 4,400 wppm V; 750 wppm Ni and 35.6 weight percent $WO_3$ and $Al_2O_3$. Solid B was divided into two portions, herein designated $B_1$ and $B_2$. Portion $B_1$ was extracted with 0.5M nitric acid solution at 140° F. and atmospheric pressure for about 30 minutes at a concentration of 1 gram $B_1$ to 100 ml extractant. Solid $B_2$ was contacted with an oxygen-containing gas (air) for 3 hours at 752° F. to decrease the carbon content of the solid. The substantially carbon-free resulting solid was then subjected to the same extractants as described for Solid $B_1$. The results are summarized in Table I.

TABLE I

| Experiment | Sample | Extractant | Wt. % Removal | | | |
|---|---|---|---|---|---|---|
| | | | Al | W | Ni | V |
| 1 | Solid $B_1$ | 0.5 N $HNO_3$ | 0 | 0 | 41 | 10 |
| 2 | Solid $B_2$ | 0.5 N $HNO_3$ | 0 | 4 | 69 | 75 |
| 3 | Solid $B_2$ | 0.5 N HCL | 60 | 45 | 29 | 57 |

As can be seen from the data in Table 1, experiment No. 2 in which solid $B_2$ was treated in accordance with the method of present invention, removed more metal contaminants from the catalyst than the method used to treat solid $B_1$ which was not a method of the present invention. In experiment 3, which did not use an extractant in accordance with the present invention, too much tungsten was removed from the catalyst when the vanadium and nickel contaminants were removed.

What is claimed is:

1. A method of recovering a catalyst comprising a tungsten component from solids comprising said catalyst associated with coke comprising metallic components, including nickel and vanadium, said catalyst having become associated with said coke in a coking process conducted in the presence of said catalyst, which comprises the steps of:
   (a) contacting said solids with a gas comprising steam at a temperature ranging from about 1600° F. to about 2000° F. to gasify partialy said coke;
   (b) heating the resulting solids at a temperature below the fusion point of said metallic components, said temperature being no greater than about 1100° F. in the presence of a molecular oxygen-containing gas for a time sufficient to remove at least a portion of the coke from said solids;
   (c) contacting the solids resulting from step (b) in an extraction zone with an extractant comprising nitric acid at a temperature ranging from about 70° to about 250° F., at an acid strength ranging from about 0.2 normal to about 12 normal, to remove selectively said nickel and said vanadium from said solids, and
   (d) recovering said catalyst comprising said tungsten component.

2. The method of claim 1 wherein step (b) heating is conducted at a temperature ranging from about 700° to about 900° F.

3. The method of claim 1 wherein said catalyst comprises tungsten oxide on an alumina-containing support.

4. The method of claim 1 wherein said solids additionally comprise discrete particles of said metallic components, and wherein prior to step (c), said discrete particles of metallic components are separated from said solids by physical means.

5. The method of claim 1 wherein said extractant removes less than about 10 weight percent of said tungsten from said solids.

6. The method of claim 1 wherein said extractant removes less than about 5 weight percent of said tungsten from said solids.

7. The method of claim 1 wherein said extractant additionally comprises $H_2O_2$.

8. The method of claim 1 wherein said extractant comprises an acid having a strength ranging from about 0.2 normal to 1.0 normal.

* * * * *